UNITED STATES PATENT OFFICE.

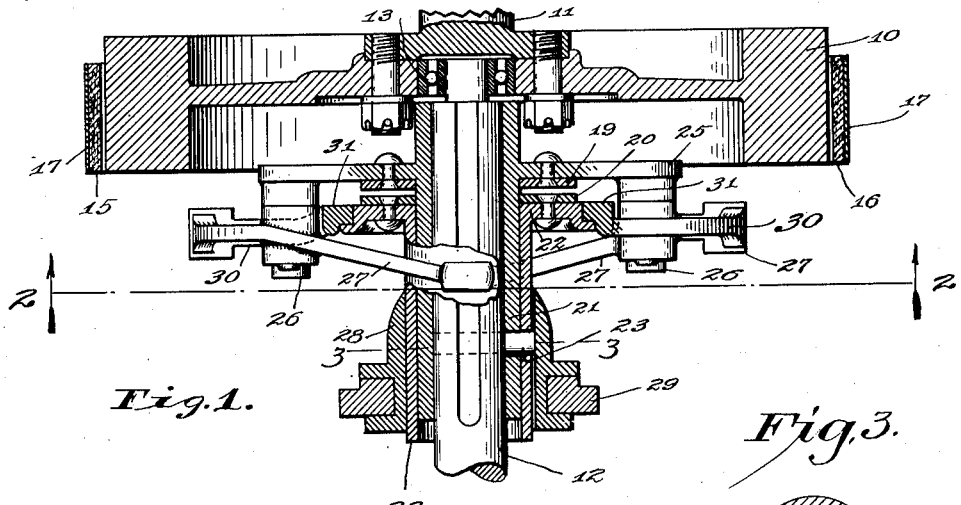
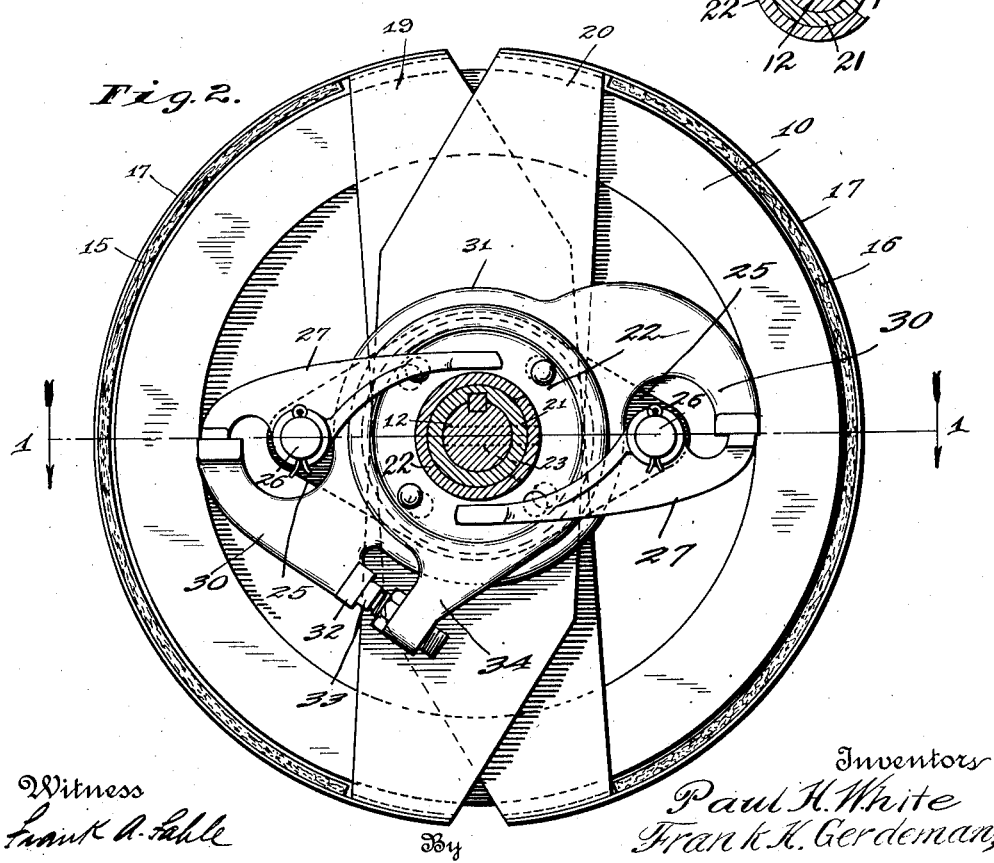

PAUL H. WHITE, OF INDIANAPOLIS, INDIANA, AND FRANK H. GERDEMAN, OF FINDLAY, OHIO, ASSIGNORS, BY MESNE ASSIGNMENTS, TO INDIANA SILO AND TRACTOR COMPANY, OF ANDERSON, INDIANA, A CORPORATION OF INDIANA.

CLUTCH.

1,361,213.     Specification of Letters Patent.     Patented Dec. 7, 1920.

Application filed May 28, 1919. Serial No. 300,405.

*To all whom it may concern:*

Be it known that we, PAUL H. WHITE, a citizen of the United States, residing at Indianapolis, in the county of Marion and State of Indiana, and FRANK H. GERDEMAN, a citizen of the United States, residing at Findlay, in the county of Hancock and State of Ohio, have invented a new and useful Clutch, of which the following is a specification.

It is the object of our invention to provide a simple and effective clutch, or brake, especially for automotive devices, which will stay in either clutching or unclutching position without being held, which is flexible so that it permits the associated shafts to be out of alinement, and by which the ordinary fly-wheel may serve as one clutch member without requiring modification and the outer periphery of this fly-wheel is gripped by a simply operated clutch band.

The accompanying drawing illustrates our invention: Figure 1 is an axial section through a clutch embodying our invention, taken substantially on the line 1—1 of Fig. 2; Fig. 2 is a section on the line 2—2 of Fig. 1, showing the main clutch parts in elevation; and Fig. 3 is a section on the line 3—3 of Fig. 1.

The wheel 10 which forms one member of the clutch or brake is mounted in any suitable way on the end of a driving shaft 11, which may be the crank shaft of the prime mover of any automotive device, such as an automobile, in which case the wheel 10 may be a fly-wheel and is usually on the rear end of the shaft. A driven shaft 12, which is to be clutched to the shaft 11, conveniently has its front end mounted in bearings 13 within the fly-wheel 10.

The other member of the clutch or brake is formed by two arc-shaped clutch bands 15 and 16, which are mounted close to the outer periphery of the fly-wheel 10 so as to be engaged therewith and disengaged therefrom, to clutch and unclutch the two shafts 11 and 12 when the device is used as a clutch. Each clutch band 15 and 16 forms almost a semicircle, as is clear from Fig. 2; and the ends of the sheet-metal carrying parts 17 of these two clutch bands are attached to two cross-bars 19 and 20 which are carried by two concentric sleeves 21 and 22 mounted on the shaft 12. Both of these sleeves are fixed axially on the shaft 12, and one of them is fixed rotatively thereon; as shown, the inner sleeve 21 carrying the cross-bar 19 is keyed to the shaft 12, and the sleeve 22 carrying the cross-bar 20 is pinned to such shaft by a cross-pin 23 which works in a circumferentially extending slot in such sleeve. The two ends of the sheet-metal carrying member 17 of each clutch band are attached to ends of the cross-bars respectively, and the cross-bars are movable relatively to each other in the manner of scissors blades, so that by such relative movement of the cross-bars the clutch bands 15 and 16 are moved into and out of engagement with the periphery of the fly-wheel. The spring of the sheet metal parts 17 is such that it tends to separate the clutch bands from the fly-wheel, and to move the cross-bars 19 and 20 relatively to each other to produce such separation; this spring action between the cross-bars may or may not be supplemented in other ways.

The cross-bars 19 and 20 are made of flat relatively thin spring metal, set edgewise parallel to the plane of their scissors-like movement, or transverse to the shafts. This gives stiffness in the plane of such movement, but provides considerable flexibility to the clutch axially thereof and of the shafts, and so permits the shafts 11 and 12 to operate out of alinement with each other; this ability is frequently very desirable, especially in tractors.

In order to contract the clutch bands, to set the clutch, the sleeve 21 is provided with laterally projecting arms 25, which carry pins 26 on which levers 27 are mounted. The inner ends of the levers 27 coöperate with a sliding cone 28 slidable axially on the sleeve 22 by any suitable operating mechanism 29 to force the inner ends of the levers 27 outward or permit them to move inward; the large end of this cone leads into a cylindrical portion, as is clear from Fig. 1, so that the spring of the parts 17 will not tend to release the clutch when it is set. The outer ends of the levers 27 coöperate with fingers 30 on a ring 31 mounted on and slightly rotatable relatively to the sleeve 22. The ring 31 has an abutment 32 which coöperates with a screw 33 carried by a finger 34 projecting from the sleeve 22; by adjustment of the screw 33, the relative position of the sleeve 22 and the ring 31 may be adjusted to control the effect of a given movement of the levers 27 on the clutch bands 15 and 16.

In operation, the clutch is set and released by shifting the cone 28. When such cone is shifted toward the fly-wheel, it forces apart the inner ends of the levers 27, and thereby shifts the ring 31, and through such ring and the engagement of its abutment 32 with the screw 33 shifts the sleeve 22 and the cross-bar 20 in a counter-clockwise direction relative to the sleeve 21 and the cross-bar 19; this carries the two ends of each clutch band 15 and 16 farther apart angularly, and so draws such clutch bands into engagement with the periphery of the fly-wheel to set the clutch and cause the shafts 11 and 12 to rotate together. To release the clutch, the cone 28 is shifted away from the fly-wheel; this permits the spring of the sheet-metal parts 17 to separate the clutch bands from the fly-wheel, and, by a reverse train of actions from that described above, to force the inner ends of the levers 27 inward. By reason of the flexible nature of the cross-bars 19 and 20 axially of the clutch, the two shafts 11 and 12 may be considerably out of line with each other without interfering with the action of the clutch.

We claim as our invention:

1. A clutch, comprising a rotatable member, two arc-shaped clutch bands coöperating with the outer surface of said rotatable member, a pair of cross-bars having a relative scissors-like movement, each of said clutch bands having its two ends connected for stresses in circumferentially opposite directions to said two cross-bars respectively, and means for producing relative movement between said two cross-bars.

2. A clutch, comprising a rotatable member, two arc-shaped clutch members coöperating with a circumferentially extending surface of said rotatable member, a pair of cross-bars having a relative scissors-like movement, each of said clutch members having its two ends connected for stresses in circumferentially opposite directions to said two cross-bars respectively, and means for producing relative movement between said two cross-bars.

3. A clutch, comprising a rotatable member, two arc-shaped clutch bands coöperating with the outer surface of said rotatable member, a pair of cross-bars having a relative scissors-like movement, each of said clutch bands having its two ends connected to said two cross-bars respectively, a lever mounted on one of said cross-bars, said lever being arranged to act on the other cross-bar so that by its movements it controls the relative scissors-like movement of the two cross-bars, and means for operating said lever.

4. A clutch, comprising a rotatable member, two arc-shaped clutch members coöperating with a circumferentially extending surface of said rotatable member, a pair of cross-bars having a relative scissors-like movement, each of said clutch members having its two ends connected to said two cross-bars respectively, a lever mounted on one of said cross-bars, said lever being arranged to act on the other cross-bar so that by its movements it controls the relative scissors-like movement of the two cross-bars, and means for operating said lever.

5. A clutch, comprising a rotatable member, two arc-shaped clutch bands coöperating with the outer surface of said rotatable member, a pair of cross-bars having a relative scissors-like movement, each of said clutch bands having its two ends connected to said two cross-bars respectively, a lever mounted on one of said cross-bars, said lever being arranged to act on the other cross-bar so that by its movements it controls the relative scissors-like movement of the two cross-bars, and an axially slidable cone associated with said lever so that by its axial movements it operates said lever.

6. A clutch, comprising a rotatable member, two arc-shaped clutch members coöperating with a circumferentially extending surface of said rotatable member, a pair of cross-bars having a. relative scissors-like movement, each of said clutch members having its two ends connected to said two cross-bars respectively, a lever mounted on one of said two cross-bars, said lever being arranged to act on the other cross-bar so that by its movements it controls the relative scissors-like movement of the two cross-bars, and an axially slidable cone associated with said lever so that by its axial movements it operates said lever.

7. A clutch, comprising a rotatable member, two arc-shaped clutch bands coöperating with the outer surface of said rotatable member, a pair of cross-bars having a relative scissors-like movement, each of said clutch bands having its two ends connected to said two cross-bars respectively, a lever mounted on one of said cross-bars, a member co-axial with said two cross-bars and having a circumferentially adjustable torque connection to the other cross-bar from that which carries said lever, said lever being arranged to act on said circumferentially adjustable member and therethrough on said other cross-bar so that by the operation of the lever it varies the angular relation of said two cross-bars.

8. A clutch, comprising a rotatable member, two arc-shaped clutch members coöperating with a circumferentially extending surface of said rotatable member, a pair of cross-bars having a relative scissors-like movement, each of said clutch members having its two ends connected to said two crossbars respectively, a lever mounted on one of said cross-bars, a member co-axial with said two cross-bars and having a circumferentially adjustable torque connection to the other cross-bar from that which carries said lever, said lever being arranged to act on said circumferentially adjustable member and therethrough on said other cross-bar so that by the operation of the lever it varies the angular relation of said two cross-bars.

9. A clutch, comprising a rotatable member, two arc-shaped clutch bands coöperating with the outer surface of said rotatable member, a pair of cross-bars having a relative scissors-like movement, each of said clutch bands having its two ends connected for stresses in circumferentially opposite directions to said two cross-bars respectively, and means for producing relative movement between said two cross-bars, said cross-bars being flat spring bars set edgewise parallel to the plane of said scissors-like movement so that they are stiff in the plane of such movement but flexible axially of the rotatable member.

10. A clutch, comprising a rotatable member, two arc-shaped clutch members coöperating with a circumferentially extending surface of said rotatable member, a pair of cross-bars having a relative scissors-like movement, each of said clutch members having its two ends connected for stresses in circumferentially opposite directions to said two cross-bars respectively, and means for producing relative movement between said two cross-bars, said cross-bars being flat spring bars set edgewise parallel to the plane of said scissors-like movement so that they are stiff in the plane of such movement but flexible axially of the rotatable member.

11. A clutch, comprising two relatively rotatable members, two bars carried by one of said members and relatively angularly movable about the axis of their carrying member, said bars being flat spring bars set edgewise parallel to the plane of such angular movement so that they are stiff in such plane but are flexible axially of said member, clutch mechanism carried by said bars to coöperate with the other of said two relatively rotatable members, and means for producing relative angular movement between said two bars.

12. A clutch, comprising two relatively rotatable members, two bars carried by one of said members and relatively angularly movable about the axis of their carrying member, said bars being flat spring bars set edgewise parallel to the plane of such angular movement so that they are stiff in such plane but are flexible axially of said member, a flexible clutch band having its two ends connected to said two bars respectively and coöperating with the outer surface of the other rotatable member, and means for producing relative angular movement between said two bars.

13. A clutch, comprising two relatively rotatable members, two bars carried by one of said members and relatively angularly movable about the axis of their carrying member, said bars being flat spring bars set edgewise parallel to the plane of such angular movement so that they are stiff in such plane but are flexible axially of said member, a flexible clutch element having its two ends connected to said two bars respectively and coöperating with a circumferentially extending surface of the other rotatable member, and means for producing relative angular movement between said two bars.

14. A clutch, comprising a rotatable member, two arc-shaped clutch bands coöperating with the outer surface of said rotatable member, a pair of cross-bars having a relative scissors-like movement, each of said clutch bands having its two ends connected to said two cross-bars respectively, and means for producing relative movement between said two cross-bars, said clutch bands being resilient and tending to move said cross-bars in the direction to separate the clutch bands from said outer surface.

15. A clutch, comprising a rotatable member, two arc-shaped clutch members coöperating with a circumferentially extending surface of said rotatable member, a pair of cross-bars having a relative scissors-like movement, each of said clutch members having its two ends connected to said two cross-bars respectively, and means for producing relative movement between said two cross-bars, said clutch members being resilient and tending to move said cross-bars in the direction to separate the clutch members from said circumferentially extending surface.

16. A clutch, comprising two relatively rotatable members, two bars carried by one of said members and relatively angularly movable about the axis of their carrying member, said bars being flat spring bars set edgewise parallel to the plane of such angular movement so that they are stiff in such plane but are flexible axially of said member, a flexible clutch band having its two ends connected to said two bars respectively and coöperating with the outer surface of the other rotatable member, and means for producing relative angular movement between said two bars, said clutch band being resilient and tending to move said two bars in the direction to separate the clutch band from said outer surface.

17. A clutch, comprising two relatively rotatable members, two bars carried by one of said members and relatively angularly movable about the axis of their carrying member, said bars being flat spring bars set edgewise parallel to the plane of such angular movement so that they are stiff in such plane but are flexible axially of said member, a flexible clutch element having its two ends connected to said two bars respectively and coöperating with a circumferentially extending surface of the other rotatable member, and means for producing relative angular movement between said two bars, said clutch element being resilient and tending to move said two bars in the direction to separate the clutch element from said circumferentially extending surface.

In witness whereof, we have hereunto set our hands at Findlay, Ohio, this 9th day of May, A. D. one thousand nine hundred and nineteen.

PAUL H. WHITE.
FRANK H. GERDEMAN.